United States Patent [19]

Kimizuka et al.

[11] Patent Number: 4,638,421
[45] Date of Patent: Jan. 20, 1987

[54] POSITION FEEDBACK SYSTEM

[75] Inventors: Norio Kimizuka; Akira Sogabe; Mituyosi Abo, all of Mobara, Japan

[73] Assignee: Futaba Denshi Kogyo Kabushiki Kaisha, Mobara, Japan

[21] Appl. No.: 650,542

[22] Filed: Sep. 14, 1984

[30] Foreign Application Priority Data

Sep. 14, 1983 [JP] Japan ............................. 58-169971

[51] Int. Cl.$^4$ .............................................. G05B 9/00
[52] U.S. Cl. ..................................... 364/167; 364/183
[58] Field of Search .............. 364/474, 475, 167, 170, 364/183

[56] References Cited

U.S. PATENT DOCUMENTS

| 4,386,306 | 5/1983 | Nishimura | 364/474 |
|---|---|---|---|
| 4,404,626 | 9/1983 | Aoyama | 364/167 |
| 4,451,892 | 5/1984 | McMurtry | 364/474 |
| 4,549,271 | 10/1985 | Nozama | 364/474 |
| 4,567,342 | 1/1986 | Nozawa | 364/474 |

Primary Examiner—Jerry Smith
Assistant Examiner—Allen MacDonald
Attorney, Agent, or Firm—Oblon, Fisher, Spivak, McClelland & Maier

[57] ABSTRACT

A position feedback system capable of effectively preventing an NC apparatus from failing in a position signal reading operation due to mechanical vibration of a machine tool or the like, including an up-down counter for counting up or down phase signals supplied from a machine position encoder, a comparator for comparing the counted value with a reference value, and a pulse generator for supplying an up- or down-counting pulse having a time period larger than a minimum time period necessary for the reading operation of the NC apparatus to the comparator to initiate a comparison operation regarding the counter contents which generally reflects the number of phase signals, since spurious noise signals have a tendency to cancel each other out. Based on the comparison, a counting pulse is fed to the NC apparatus and a pulse is applied to the counter to cancel one counted value. The operation is carried out until the counted value becomes the same as the reference value.

9 Claims, 8 Drawing Figures

FIG.6
FIG.8
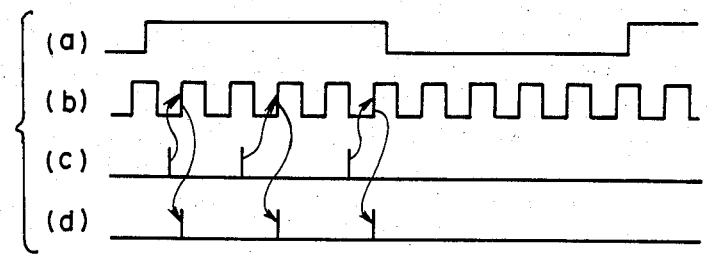
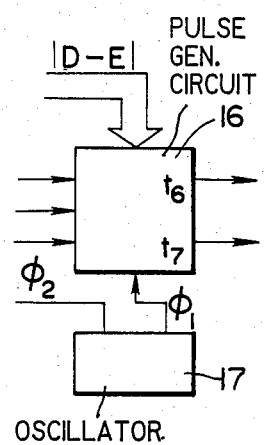
FIG.7
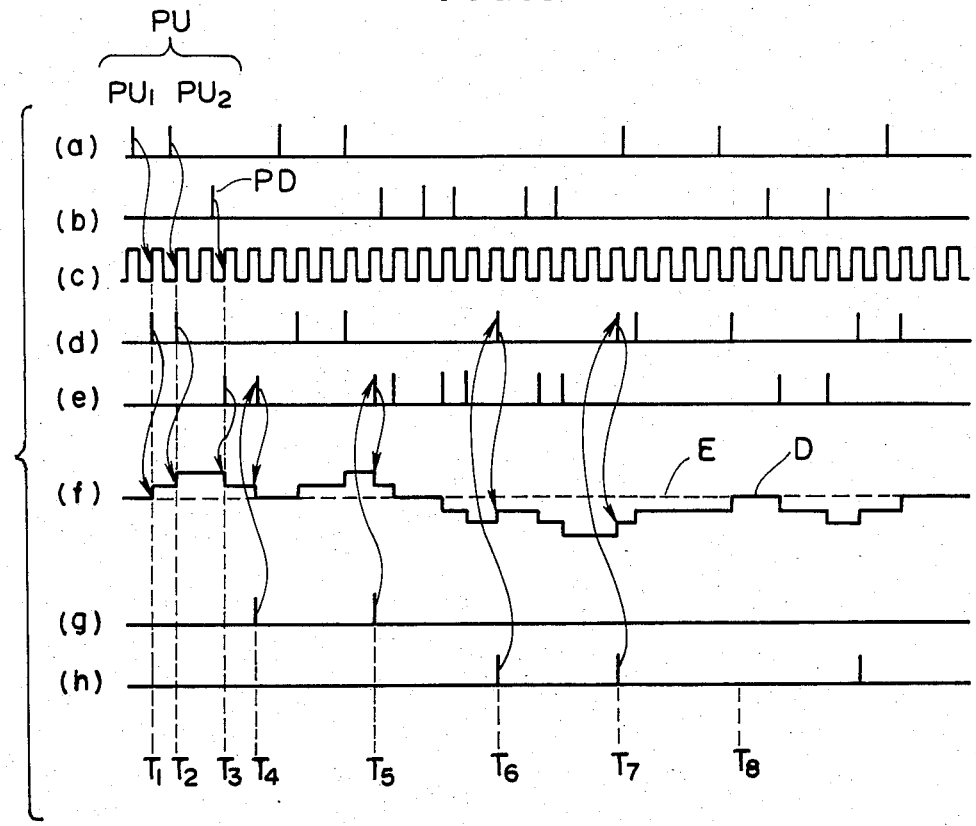

POSITION FEEDBACK SYSTEM

BACKGROUND OF THE INVENTION

1. Field of the Invention

This invention relates to a position feedback system adapted to determine the working position of a machine tool or the like in a closed loop by means of a numerically controlled apparatus, and more particularly to a position feedback system adapted to eliminate the failure of operation of a numerically controlled apparatus due to the mechanical vibration of the machine tool side or the like.

2. Description of the Prior Art

Recently, the control of a machine tool or the like utilizing a numerically controlled apparatus (hereinafter referred to as "NC apparatus") has been carried out by a closed-loop control system which is adapted to accomplish the automation of working and the working with a high precision by comparing a current working position data on the machine tool side returned to the NC apparatus with a working position data stored in the NC apparatus and feeding the deviation therebetween as a working command signal to the machine tool side.

An example of such a closed-loop control system used for this purpose is shown in FIG. 1 which is adapted to detect the working position of a machine tool side by means of a linear-type measuring device and return the position data in the form of a working command signal to the NC apparatus side.

The system shown in FIG. 1 includes a working table 1 of a machine tool on which a work 2 is securely disposed and a scale 4 of a measuring device 3 is fixed.

The measuring device 3 includes an encoder 5 for detecting the movement of the scale 4, which is fixed at the fixed bed 6 of the machine tool.

Reference numeral 7 designates an NC apparatus which is adapted to generate a working command signal, which allows a driving source 8, such as, for example, a motor to be driven to move the table 1. With the movement of the working table 1, working of the work 2 is proceeded by a working shaft 9, and the working position is read by the measuring device 3 and is returned through a feedback unit 10 to the NC apparatus side 7.

In other words, the relative movement between the scale 4 and the encoder 5 by the command of the NC apparatus 7 is returned as a current positional signal through the feedback unit 10 to the NC apparatus side 7 so that desired working may be automatically accomplished by the NC apparatus 7.

In this instance, it is required that the measuring device 3 comprising the scale 4 and encoder 5 discriminates and feeds the moving direction of the scale and encoder as well as the relative movement between the both to the side of feedback unit 10.

For example, every time when the scale 4 is relatively moved by a unit length (1 μm-several tens μm) with respect to the encoder 5, the encoder 5 is caused to generate two signals of which phases are different by a degree of 90° from each other. This is carried out, for example, by arranging movement detecting devices at positions in the encoder 5 different in phase by 90° from each other. Further, the two signals thus generated different in phase by 90° (hereinafter referred to as "A phase signal" and "B phase signal", respectively) are treated to carry out discrimination of the direction and detection of the movement.

More particularly, when the A phase signal and B phase signal respectively shown in FIGS. 2(a) and 2(b) are generated in the encoder 5 with the movement of the scale 4, the A phase signal is supplied to a differentiating circuit 51 shown in FIG. 3 and the leading portion thereof is differentiated. The B phase signal is introduced to a phase inverting circuit 52. When the A phase signal rises while the B phase signal is during period of time "1", a gate circuit 53 is opened so that a differentiation pulse in synchronism with the rising of the A phase signal is supplied to the terminal $t_1$ as shown in FIG. 2(c). When the A phase signal rises while the B phase signal is during a period of time "0", the B phase signal having an inverted phasea causes a gate circuit 54 to be opened, which results in a differentiation pulse in synchronism with the rising of the A phase signal being supplied to the terminal $t_2$ as shown in FIG. 2(d). The A phase signal and B phase signal have correlation that the A phase signal is generated with a phase lag of 90° with respect to the B phase signal, when the working table 1 is moved in the left direction with respect to the fixed bed 6 as shown in FIG. 1, whereas it is generated with a phase lead of 90° with respect to the B phase signal when the working table 1 is moved in the right direction.

Thus, supposing that the movement of the working table 1 in the left direction is positive and that in the right direction is negative, the direction and amount of movement of the table 1 can be measured by up-counting of a counter by means of a pulse generated at the terminal $t_1$ and down-counting of the counter by means of that generated at the terminal $t_2$.

Further, an increase in resolution of the measurement is carried out by electrically equally dividing the A phase signal and B phase signal to form a plurality of pulses for up-counting or down-counting during one cycle of each phase signal.

The positional data measured by the measuring device 5 is treated in the feedback unit 10 and then returned to the NC apparatus side 1, to thereby form a closed loop.

However, in the control system described above, the NC apparatus is restricted in the capacity of reading pulse signals. Thus, when pulse signals are subsequently supplied at highly short intervals from the feedback unit 10 to the NC apparatus 7, the NC apparatus fails to read the signals to cause the operation of the whole system to be stopped.

More particularly, in FIG. 1, when a tool is mounted on the working shaft 9 and deep cuts are carried out on the work 2, vibration due to cutting is transmitted through the working table 1 directly to the scale 4. The encoder 5 detects the vibration in the form of displacement of the scale 4 and feeds it in the form of a counting pulse through the feedback unit 10 to the NC apparatus 7.

The vibration generally has a highly short cycle, therefore, the counting pulse supplied to the NC apparatus 7 has a highly narrow width and a short cycle period. Further, the direction of the movement is also subjected to such vibration so that the NC apparatus 7 may not follow the supply of the counting pulse to fail to read it.

More specifically, this causes the advance and delay of the A and B phase signals to be generated at random as shown in FIGS. 4(a) and (b), resulting in a count-up signal shown in FIG. 4(c) and a count-down signal shown in FIG. 4(d) being repeatedly supplied to the NC apparatus. Also, the counting pulse has a highly short cycle. Thus, the NC apparatus fails to follow the supply of the pulses and read the pulses.

SUMMARY OF THE INVENTION

The present invention has been made in view of the foregoing disadvantages of the prior art.

Accordingly, it is an object of the present invention to provide a position feedback system which is capable of preventing an NC apparatus from failing in the signal reading operation and from effectively carrying out the closed-loop control.

The foregoing and other objects are achieved by controlling the application of control pulses to the NC apparatus to occur at a predetermined time period during which time a phase signal from the encoder is normally to be supplied from the encoder. According to the invention, the number of phase signals and the direction thereof from the encoder is counted in an up-down counter in order to keep track of the total number of phase signals due to actual movement of the bed of the machine tool and the number of spurious signals produced due to mechanical vibrations of the type above described. Since the spurious signals generally randomly occur on both the up- and down-counter inputs, they have a tendency to cancel each other, whereas the phase signals, which are not randomly generated tend to accumulate in one or the other direction in the counter. Then, each time a control pulse is applied at the predetermined time interval to the NC apparatus, the up-down counter content, which is a reflection of the phase signals accumulated, is interrogated and an output is produced accordingly. The counter is decremented or incremented as the case may be, to cancel a counted value in the counter.

More particularly, a position feedback system of the present invention comprises a counter means, a comparator means and a pulse generating means. The position feedback system is adapted to carry out the up- or down-counting of a counting pulse supplied from a measuring device provided in a machine tool such as, for example, the phase signals of the encoder 5, or the like in real time by means of the counter means and compare the counted value with a reference value in the comparator means, thereby to cause the pulse generator means to generate and supply a single up- or down-counting pulse having the predetermined time interval, which is larger than a minimum time interval necessary for the NC apparatus to carry out the signal reading operation depending upon the result of comparison obtained in the comparator means. Then, the counting pulse is returned to the counting means to cancel one counted value of the counter means. Such operation is carried out until the counted value of the counter means becomes the same as the reference value in the comparator means so that the NC apparatus may constantly accomplish reading of the counted pulse at a high speed.

BRIEF DESCRIPTION OF THE DRAWINGS

Other objects and many of the attendant advantages of the present invention will be readily appreciated as the same becomes better understood by reference to the following detailed description when considered in connection with the accompanying drawings, wherein:

FIGS. 6 and FIG. 7 each are a timing chart showing the operation of the embodiment shown in FIG. 5; and FIG. 8 is a diagrammatic view showing the essential part of another embodiment of a position feedback system according to the present invention.

DETAILED DESCRIPTION OF THE PREFERRED EMBODIMENTS

Now, a position feedback system according to the present invention will be hereinafter described with reference to the drawings.

Figure 5:
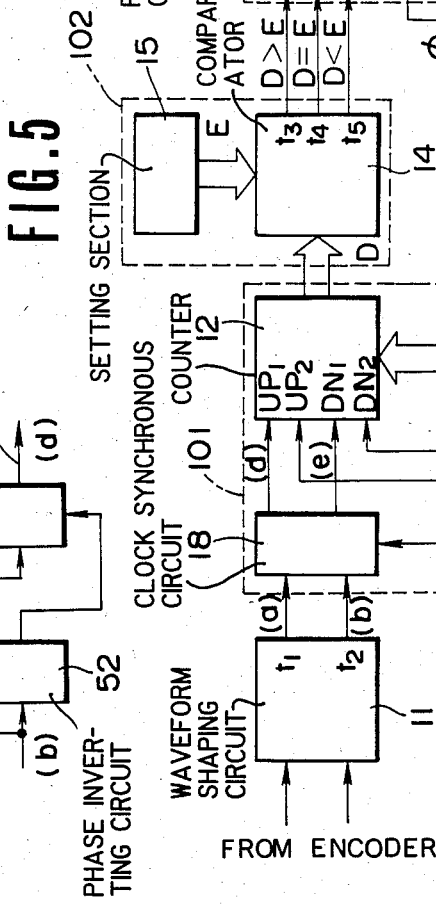
FIG. 5 is a block diagram showing one embodiment of a position feedback system according to the present invention.

FIG. 5 is a block diagram showing one embodiment of a position feedback system according to the present invention.

As described above, the apparatus of the present invention includes a counter means 101, comparator means 102 and a pulse generating means 103. The apparatus may be provided with a waveform shaping circuit 11 and a waveform converting circuit 19 attached thereto as desired.

The waveform shaping circuit 11 is adapted to receive A and B phase signals of a measuring device provided on the side of a machine tool or the like to form counting pulses for up-counting and down-counting at the terminals $t_1$ and $t_2$ thereof. In this instance, when the counting pulses for up- and down-counting is supplied directly from the measuring device side, the waveform shaping circuit 11 may be eliminated. The output of the waveform shaping circuit 11 is introduced to a clock synchronous circuit 18 provided in the counter means 101 to be subjected to synchronization by means of a clock signal from a clock oscillator described hereinafter and fed to the next step. Reference numeral 12 designates a counter which includes two up-count terminals $UP_1$ and $UP_2$ supplied thereto an input for up-counting and two down-count terminals $DN_1$ and $DN_2$ supplied thereto an input for down-counting and is adapted to carry out up- and down-counting.

It is required that the counter 12 has a counting speed sufficient to count also a high speed pulse generated with, for example, the mechanical vibration of a machine tool side or the like. Also, the counter 12 is required to have a counting capacity approximately twice as large as the number of high speed pulses generated in a lump on the machine tool side. Further, the counter 12 is adapted to allow the substantially same value as a reference value set at a reference value setting section described hereinafter by a preset section 13 to be set as an initial value thereof.

The comparator means 102 comprises a comparator 14 and a reference value setting section 15 and is adapted to accomplish the comparison between a counted value D obtained by the counter 12 and a reference value E set at the reference value setting section 15 to supply a comparison signal to the terminal $t_3$, $t_4$ and $t_5$ at $D>E$, $D=E$ and $D<E$, respectively.

Reference numeral 16 designates a pulse generating circuit constituting the pulse generating means 103, which comprises, for example, a gate circuit and is adapted to generate a counting pulse depending upon the result of comparison by the comparator 14. More particularly, the pulse generating circuit 16 serves to supply a counting pulse for up-counting to the terminal $t_6$ in synchronism with a first clock signal $\phi_1$ of a clock oscillator 17 when $D>E$ and supply a counting pulse for down-counting to the terminal $t_7$ in synchronism with the clock signal $\phi_1$ when $D<E$. The counting pulse generated at the terminal $t_7$ is returned to the up-count terminal $UP_2$ of the counter 12.

The clock oscillator 17 serves to generate clock signals of two phases or the above mentioned first clock signal $\phi_1$ and second clock signal $\phi_2$.

The first clock signal $\phi_1$ has a cycle larger than a minimum time period necessary for an NC apparatus side to read a signal. In general, the NC apparatus side can read a pulse signal having a cycle as small as 1 $\mu S$, thus, the clock signal would be required to have a cycle of about 1-several $\mu S$. Also, the second clock signal $\phi_2$ serves to synchronize a counting pulse generated from the waveform shaping circuit 11 in order to prevent the counting pulse from concurrently reaching the up-count terminals $UP_1$ and $UP_2$ or the down-count terminals $DN_1$ and $DN_2$ of the counter 12. For this purpose, the second clock signal $\phi_2$ would be required to have a cycle smaller than a predictable minimum cycle of a high speed pulse generated from the machine tool side and have a phase shifted from the first clock signal $\phi_1$ so that the risings of both signals may not concurrently occur.

For example, the second clock signal $\phi_2$, as shown in FIG. 6(b), may be selected to have a cycle of 1/n (n: integer) with respect to the clock signals $\phi_1$ shown in FIG. 6(a) and have a rising phase different from that of the first clock signal $\phi_2$. Such selection of the clock signals $\phi_1$ and $\phi_2$ prevents the two counting pulses from being concurrently introduced to the input side of the counter 12 by synchronizing the counting pulse generated from the pulse generating circuit 16 with the leading of the clock signal $\phi_1$ and synchronizing the counting pulse generated from the waveform shaping circuit 11 with the leading of the clock pulse $\phi_2$.

The clock signal $\phi_2$ from the clock oscillator 17 is supplied to a clock synchronous circuit 18 and serves to synchronize the counting pulse of the waveform shaping circuit 11 shown in FIG. 6(c) therewith to convert it to a counting pulse shown in FIG. 6(d).

The clock synchronous circuit 18 comprises, for example, a flip-flop circuit and a diferentiating circuit and may utilize a circuit structure well-known in the art which is also called a digital differentiating circuit.

The provision of the waveform converting circuit 19 depends upon the signal treating manner of the NC apparatus side and the circuit 19 is adapted to carry out a treatment such as the widening of the counting pulse generated from the pulse generating circuit 16 or the conversion of the counting pulse into the A and B phase signals having the same configuration as the output of the encoder of the measuring device.

Now, the manner of operation of the position feedback system constructed as described above will be described hereinafter.

Figure 1:
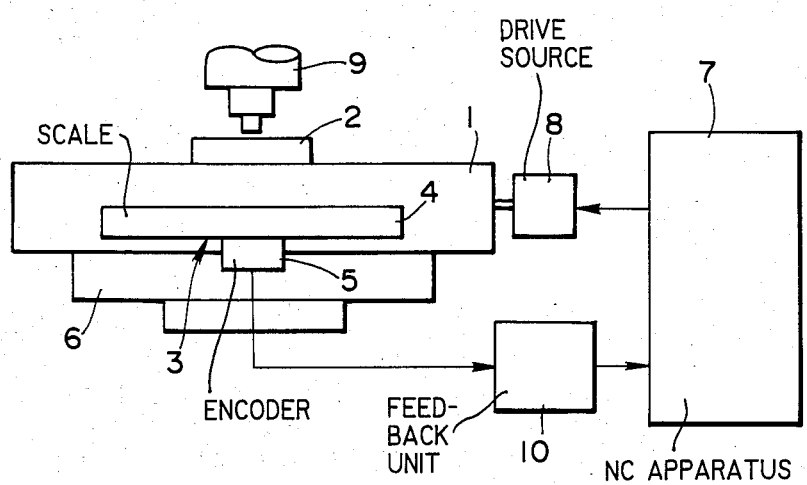
FIG. 1 is a schematic view showing a conventional control system for carrying out a closed-loop positioning control of a machine tool or the like by means of an NC apparatus.
Figure 2:
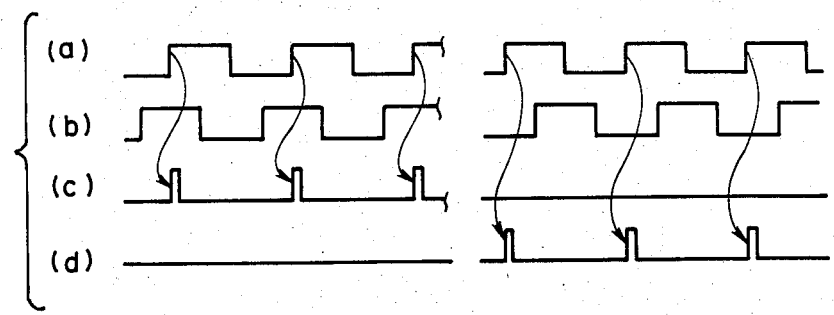
FIGS. 2 and FIG. 3 each are a diagrammatic view for explaining the formation of a counting pulse in a measuring device.
Figure 4:
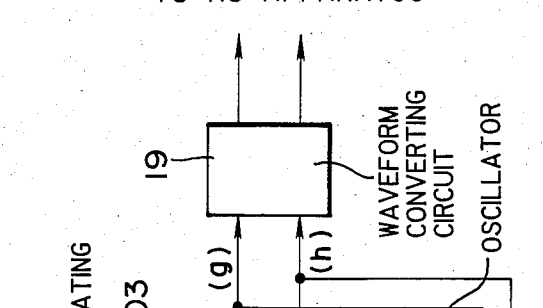
FIG. 4 is a diagrammatic view for explaining problems in a conventional closed-loop control system.
Figure 3:
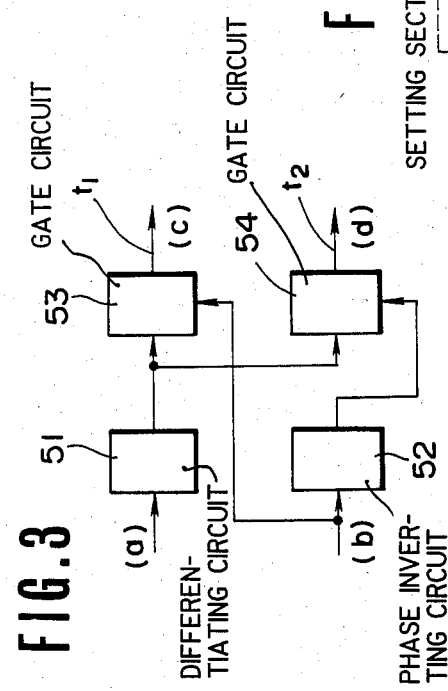

First, the reference value E is set in the reference value setting section 15. Determination of the reference value E may be carried out in various ways. For example, supposing that the high speed pulse on the machine tool side is generated in both the up-counting direction and down-counting direction under the substantially same conditions, the reference value E is determined to be one half of the maximum counting value of the counter 12. Concurrently, the same value as the reference value E is set as an initial value in the counter 12 by the preset section 13. The A phase signal and B phase signal formed in the encoder of the measuring device provided on the machine tool side are supplied to the waveform shaping circuit 11 and converted into a counting pulse for up-or down-counting. The conversion may be accomplished by means of such a circuit structure as that shown in FIG. 3 and described above.

Now, when the movement of the working table of the machine tool in the left direction is defined to be a positive movement, the counting pulse PU for up-counting is generated at the terminal $t_1$ of the waveform shaping circuit 11 as shown in FIG. 7(a) every time when the working table moves by a unit length (for example, 1 $\mu m$) in the left direction. On the contrary, when the working table is moved by a unit length in the right direction or negative direction, the counting pulse PD for downcounting as shown in FIG. 7(b) is generated at the terminal $t_2$ of the waveform shaping circuit 11.

The counting pulses are introduced into the next step or clock synchronous circuit 18 and synchronized with the leading of the second clock signal $\phi_2$ generated from the clock oscillator 17. More particularly, supposing that the clock signal $\phi_2$ is generated from the clock oscillator 17 as shown in FIG. 7(c), the counting pulses are transferred to the counter 12 in synchronism with the leading of the clock signal $\phi_2$ firstly appearing after the generating of the counter pulses PU and PD. For example, the counting pulse $PU_1$ for up-counting shown in FIG. 7(a) is synchronized with the clock signal $\phi_2$ shown in FIG. 7(c) at time $T_1$ and the counting pulse $PU_2$ is synchronized with the clock signal $\phi_2$ at time $T_2$, and then the counting pulses are transferred to the next step.

All the counting pulses randomly generated at the terminals $t_1$ and $t_2$ are synchronized by the clock synchronous circuit 12 in such a manner as described above. In this instance, since the cycle of the clock signal $\phi_2$ is determined to the smaller than the generation cycle of the counting pulse, two counting the pulses are never generated within the generation cycle of the clock signal $\phi_1$ and the generating pulses are positively synchronized one by one.

The synchronized counting pulses PU and PD are supplied to the terminal $UP_1$ for up-counting and the terminal $DN_1$ for down-counting, respectively.

The counter 12, as described above, has the reference value E preset by the preset section 13. Accordingly, when the counting pulse shown in FIG. 7(d) is supplied to the up-count terminal $UP_1$ at time $T_1$, the counted value is counted up by one with respect to the reference value E as shown in FIG. 7(f). Subsequenlty, when the counting pulse for up-counting is supplied to the up-count terminal $UP_1$ as shown in FIG. 7(d), the counter 12 counts up the counted value with respect to reference value E as shown in FIG. 7(f) depending upon the number of counting pulses.

Also, when the counting pulse PD for down-counting is generated at the terminal t of the waveform shaping circuit 11 as shown in FIG. 7(b), synchronized by means of the clock signal $\phi_2$ and then supplied to the down-count terminal $DN_1$ of the counter 12 at time $T_3$ as shown in FIG. 7(e), the counter 12 decreases the counted value by one as shown in FIG. 7(f). Then, the counted value D of the counter 12 is introduced into the comparator 14 to be compared with the reference value E of the reference value setting section 15. This results in a comparison signal being generated at the terminals $t_3$, $t_4$ and $t_5$ when $D<E$, $D=E$ and $D>E$, respectively. Such comparison operation is carried out whenever the counted value D of the counter 12 is varied, and causes the output to be generated at any one of the terminals $t_3$–$t_5$ until the next variation of the counted value occurs.

The clock oscillator 17, as described above, generates the clock signal $\phi_1$ in addition to the clock signal $\phi_2$ of which the cycle is n times as large as that of the signal $\phi_2$ and the leading phase is shifted from that of the signal $\phi_2$.

When the clock signal $\phi_1$ is generated at time $T_4$, it is fed to the pulse generating circuit 16. At time $T_4$, the counted value D of the counter 12 is larger than the reference value E as shown in FIG. 7(f).

Thus, the comparator 14 generates the output at the terminal $T_3$, and the pulse generating circuit 16 receives the clock signal $\phi_1$ to generating the counting pulse for up-counting at the terminal $t_6$ as shown in FIG. 7(g) and feed it to the waveform converting circuit 19. Concurrently, the counting pulse generated at the terminal $t_6$ of the pulse generating circuit 16 is returned to the down-count terminal $DN_2$ of the counter 12 and supplied to the counter 12 as the counting pulse for down-counting as shown in FIG. 7(e). This results in the counter 12 receiving the counting pulse to decrease the counted value by one as shown in FIG. 7(f). More particularly, the counter 12 carries out the counting of the counting pulse PU for up-counting and counting pulse PD for down-counting generated at the machine tool side within the cycle of the clock signal $\phi_1$ by addition and subtraction. When the counted value of the counter 12 is larger than the reference value E at the time of generation of the clock signal $\phi_1$, the counting pulse for up-counting is supplied by one to the NC apparatus side and concurrently the counted value D of the counter 12 is decreased by one.

Then, at the time of generation of the next clock signal $\phi_1$ (time $T_5$), the counted value D of the counter 12 is still larger than the reference value E as shown in FIG. 7(f). Accordingly, the pulse generating circuit 16 receives the clock signal $\phi_1$ generated at time $T_5$ and generates the counting pulse for up-counting at the terminal $t_6$ as shown in FIG. 7(g) to supply it to the waveform converting circuit 19, and the counting pulse for up-counting is returned to the down-count terminal $DN_2$ of the counter 12 as shown in FIG. 7(e) to cause the counted value D to be decreased by one as shown in FIG. 7(f).

Further, at the time when the subsequent clock signal $\phi_1$ is generated at time $T_6$, the counted value D of the counter 12 is smaller than the reference value E as shown in FIG. 7(f). Accordingly, the comparator 14 generates the output at the terminal $t_5$, and the pulse generating circuit 16 receives the output of the comparator 14 at the terminal $t_5$ and the clock signal $\phi_1$ of the clock oscillator 17 to generate the counting pulse for down-counting at the terminal $t_7$ as shown in FIG. 7(h) and feed it to the waveform converting circuit 19. Concurrently, the counting pulse generated at the terminal $t_7$ of the pulse generating circuit 16 at time $T_6$, as shown in FIG. 7(d), is returned to the up-count terminal $UP_2$ of the counter 12 so that the counted value D of the counter 12 is counted up by one to the reference value E.

Thus, the counted value D of the counter 12 within the period of generation of the clock signal $\phi_1$ is compared with the reference value, so that the counting pulse for up-counting or down-countig in synchronism with the clock signal $\phi_1$ is fed to the NC apparatus side depending upon the result of comparison by the comparator and the counting operation is carried out with respect to the counter so as to subtract the counted value D of the counter to approach the reference value E.

Further, as is seen at time $T_8$ in FIG. 7(f), when the counted value D of the counter 12 is the same as the reference value E at the time of generation of the clock signal $\phi_1$, the comparator 14 generates the output at the terminal $t_4$. In this instance, the pulse generating circuit 16 does not operate, thus, the counting pulse is not generated.

Whereas, the counting pulse generated at the terminal $t_6$ or $t_7$ of the pulse generating circuit 16 is in synchronism with the clock signal $\phi_1$, and the cycle of the clock signal $\phi_1$ is determined to have a time sufficient for the NC apparatus side to carry out the signal reading operation.

Accordingly, when the counting pulse formed in the pulse generating circuit 16 is treated in the waveform converting circuit 19 to cause the pulse width thereof to be enlarged or to be converted into the A phase signal and B phase signal having phases shifted by 90° from each other, and is supplied to the NC apparatus, the NC apparatus completely carries out the signal reading operation, to thereby detect the movement of the working table of the machine tool. The detected movement is compared with a desired one and the deviation therebetween is returned to the machine tool to carry out the closed-loop position control.

In the embodiment described above, the gate circuit constitutes the pulse generating circuit 16. Alternatively, it may be formed by, for example, a rate multiplier which is adapted to divide the input pulse depending upon the counted value of the counter 12. More particularly, when the difference between the counted value D of the counter 12 and the reference value E is introduced into the rate multiplier constituting the pulse generating circuit 16, as shown in FIG. 8; the rate multiplier serves to divide the clock signal $\phi_1$ supplied from the clock oscillator 17 and supply the divided signal to the NC apparatus. In this instance, when the frequency of the clock signal $\phi_1$ and the basic dividing ratio of the rate multiplier are represented by $f\phi_1$ and $1/A$, respectively, the rate multiplier divides the clock signal $\phi_1$ according to the following equation and generates a pulse of a frequency $f_c$:

$$f_c=(|D-E|)/A.f\phi_1$$

Further, it is of course possible that the functions of the counter means 101 and comparator means 102 are accomplished by the counting and comparing functions of the microcomputer.

As described above, in the position feedback system of the present invention, the counting pulse from the measuring device provided on the side of the machine tool or the like is once introduced into the counter means. Whereas, the pulse generating means prepares a pulse signal having a cycle larger than a minimum time period sufficient for the NC apparatus to carry out the signal reading operation, and the comparator compares the final counted value of the counter means within the time period of generation of the signal with the reference value. Depending upon the comparison result, one counting pulse for up-counting or down-counting is fed to the NC apparatus side in synchronism with the pulse signal. Simultaneously, the counted value of the counting means is decreased by one. Such operation is carried out until the counted value of the counting means becomes the same as the reference value of the comparator means.

Thus, the NC apparatus side is supplied thereto the result of counting, due to addition and subtraction, of the counting pulses generated within the cycle of the pulse signal formed in the pulse generating means, accordingly, it is positively prevented that the NC apparatus fails in the signal reading operation due to a high speed pulse or the like generated by the mechanical vibration due to deep cuts or the like on the machine tool side.

In order to prevent the generation of unnecessary vibration in such a control system, it is effective that the high speed pulse generated due to the mechanical vibration or the like is accumulated and evaluated at a fixed time interval or a cycle larger than the minimum time interval necessary for the NC apparatus to carry out the signal reading operation to form a feedback signal, because the counting pulses for up-counting and down-counting are generally repeatedly generated whereas the noise signals due to mechanical vibration are relatively random. As a result, the noise signals tend to cancel each other in the up-down counter.

This effectively eliminates the disadvantage of the prior art that a control system falls into the outage due to the failure of reading of an NC apparatus often caused when the counting pulse from a measuring device provided on the side of a machine tool or the like is directly supplied to the NC apparatus, and allows the accurate closed-loop control to be attained.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A position feedback system adapted to return a detection signal of a measuring device provided on the side of a machine tool to an NC apparatus to determine the working position of the machine tool when the machine tool is controlled by a command signal from said NC apparatus comprising:
    a counter means adapted to carry out the up-counting and down-counting of a counting pulse formed on the measuring device side and used to discriminate the direction of movement and detect the amount of movement;
    a comparator means for carrying out the comparison between the counted value of said counter means and a predetermined reference value; and
    a pulse generating means adapted to output one counting pulse for up-counting or one counting pulse for down-counting to said NC apparatus side at a time period larger than a minimum time period necessary for said NC apparatus side to carry out the signal reading operation, and supply said counting pulse for up-counting as a down-count input to said counter means and return said counting pulse for down-counting as an up-count input to said counter means;
    whereby said counting pulse is output from said pulse generating means to said NC apparatus die until said counted value of said counter means becomes the same as the reference value of said comparator means.

2. The position feedback system as defined in claim 1 further comprising a waveform shaping circuit receiving phase signals of a measuring device provided on the side of a machine tool to form said counting pulse for up-counting and down-counting at terminals and a waveform converting circuit for widening said counting pulse generated from said pulse generating means.

3. The position feedback system as defined in claim 2, wherein said waveform converting circuit converts said counting pulse into the phase signals having the same configuration as an output of an encoder of said measuring device.

4. The position feedback system as defined in claim 1, wherein said counter means comprises a clock synchronous circuit for subjecting said counting pulse to synchronize by means of a clock signal from a clock oscillator and a counter having up-count terminals to which an input for the up-counting is applied and down-counting terminals to which an input for the down-counting is applied.

5. The position feedback system as defined in claim 4, wherein said counter is capable of counting approximately twice as large as the number of high speed pulses generated in a lump on the machine tool side.

6. The position feedback system as defined in claim 4, wherein said counter is capable of setting the same value as a reference value set at a reference value setting section as an initial value thereof.

7. The position feedback system as defined in claim 1, wherein said comparator means includes a comparator and a reference value setting section.

8. The position feedback system as defined in claim 1, wherein said pulse generating means comprises:
    a clock oscillator for generating a first clock signal; and
    a pulse generating circuit for generating said counting pulse upon generation of said first clock signal depending upon the result of comparison by said comparator means.

9. The position feedback system as defined in claim 1, further comprising:
    a waveform shaping circuit receiving phase signals of a measuring device provided on the side of a machine tool to form said counting pulse for up-counting and down-counting at terminals;
    a waveform converting circuit for widening said counting pulse generated from said pulse generating means; and
    said pulse generating circuit comprising,
    a clock oscillator for generating a first clock signal and a second clock signal, and
    a pulse generating circuit for generating said counting pulse upon generation of said first clock signal depending upon the result of comparison by said comparator means, said second clock signal applied to said waveform shaping circuit by synchronize receiving of said phase signals with generation of said counting pulse.

* * * * *